US009849988B2

(12) United States Patent
Carles et al.

(10) Patent No.: US 9,849,988 B2
(45) Date of Patent: Dec. 26, 2017

(54) INTERACTIVE AIRCRAFT CABIN

(71) Applicant: STELIA AEROSPACE, Rochefort (FR)

(72) Inventors: Blaise Carles, Rochefort (FR); Pascal Carratero, Saint-Agnant (FR)

(73) Assignee: STELIA AEROSPACE, Rochefort (FR)

(*) Notice: Subject to any disclaimer, the term of this patent is extended or adjusted under 35 U.S.C. 154(b) by 67 days.

(21) Appl. No.: 15/096,565

(22) Filed: Apr. 12, 2016

(65) Prior Publication Data

US 2016/0304207 A1 Oct. 20, 2016

(30) Foreign Application Priority Data

Apr. 14, 2015 (FR) ...................................... 15 53244

(51) Int. Cl.
*B64D 11/00* (2006.01)
*B64D 11/06* (2006.01)
(Continued)

(52) U.S. Cl.
CPC ...... *B64D 11/0639* (2014.12); *B64D 11/0015* (2013.01); *B64D 11/00155* (2014.12); *B64D 11/06* (2013.01); *B64D 11/0626* (2014.12); *G07C 5/0841* (2013.01); *G08C 17/02* (2013.01); *G08C 2201/30* (2013.01); *G08C 2201/93* (2013.01)

(58) Field of Classification Search
CPC .......... B64D 11/0639; B64D 11/00155; B64D 11/0626; B64D 11/0015; B64D 11/06; G07C 5/0841; G08C 17/02; G08C 2201/30; G08C 2201/93
See application file for complete search history.

(56) References Cited

U.S. PATENT DOCUMENTS 8,467,324 B2 * 6/2013 Yousefi .................. H04N 7/183
370/310.2
8,806,521 B2 * 8/2014 Keen .................. B64D 11/0015
725/23
(Continued)

OTHER PUBLICATIONS

Stelia-Aerospace screen capture from online @ http://www.stelia-aerospace.com/ last accessed Aug. 6, 2017.*

*Primary Examiner* — Behrang Badii
*Assistant Examiner* — Daniel L Greene
(74) *Attorney, Agent, or Firm* — Im IP Law; C. Andrew Im

(57) ABSTRACT

An aircraft cabin having seats with at least one of which is paired with a passenger terminal to communicate wirelessly. A control unit of the seat transmits data on the capabilities for adjusting the seat to the passenger terminal. The passenger terminal transmits instructions for adjusting the seat to the control unit of the seat. The passenger terminal includes application software to interpret the data received from the control unit of the seat to display a representation of the possible adjustments on a screen of the passenger terminal and to interpret actions by an operator on keys of the passenger terminal as instructions for adjusting the seat. A main computer of the cabin handles the communication between the passenger terminals and crew terminals to transmit, via displays on screens of the terminals, requests from a passenger to the crew and from the crew to a passenger or group of passengers.

20 Claims, 8 Drawing Sheets

(51) Int. Cl.
*G07C 5/08* (2006.01)
*G08C 17/02* (2006.01)

(56) References Cited

U.S. PATENT DOCUMENTS

| | | | | |
|---|---|---|---|---|
| 8,957,791 B2* | 2/2015 | Macrae | G08C 17/00 340/953 |
| 9,003,454 B2* | 4/2015 | Keen | H04N 21/4222 725/76 |
| 2003/0217363 A1* | 11/2003 | Brady, Jr. | H04L 29/06 725/76 |
| 2004/0036769 A1* | 2/2004 | Sadahiro | B60R 11/0235 348/148 |
| 2005/0278753 A1* | 12/2005 | Brady, Jr. | G06F 17/30861 725/76 |
| 2010/0060739 A1* | 3/2010 | Salazar | B64D 11/0015 348/148 |
| 2010/0169821 A1* | 7/2010 | Masui | B60K 35/00 715/778 |
| 2010/0224727 A1* | 9/2010 | Bauer | B64D 11/0015 244/118.5 |
| 2013/0005336 A1* | 1/2013 | Ayotte | H04W 12/06 455/435.1 |
| 2014/0094143 A1* | 4/2014 | Ayotte | G06Q 50/18 455/411 |
| 2014/0163774 A1* | 6/2014 | Demeniuk | G08C 17/02 701/2 |
| 2014/0242910 A1* | 8/2014 | Umlauft | H04W 4/008 455/41.1 |
| 2015/0003357 A1* | 1/2015 | Schreiber | H04W 4/02 370/329 |
| 2015/0017915 A1* | 1/2015 | Hennequin | G08C 17/02 455/41.2 |
| 2015/0077337 A1* | 3/2015 | Coto-Lopez | B64D 11/0015 345/156 |
| 2015/0375865 A1* | 12/2015 | Fischer | B64D 11/0639 701/49 |
| 2016/0062618 A1* | 3/2016 | Fagan | G06F 3/04847 715/772 |

* cited by examiner

INTERACTIVE AIRCRAFT CABIN

RELATED APPLICATIONS

This application claims priority from French Patent Application No. 15 53244 filed Apr. 14, 2015, which is incorporated herein by reference in its entirety.

FIELD OF THE INVENTION

The invention belongs to the field of interactions between a passenger in an aircraft cabin and cabin devices, particularly devices for adapting the cabin comfort to his needs and for facilitating relations between a cabin crew and the passenger.

More particularly, the invention relates to an aircraft cabin in which cabin devices such as a seat or a terminal for communicating with members of the crew in charge of the cabin interact with a passenger's personal mobile terminal.

BACKGROUND OF THE INVENTION

It is known to use mobile terminals such as remote controls or call buttons to operate various devices such as for example television screens, recording devices, lights, electric curtains, call bells, etc.

These days, such remote controls are often wireless and transmit control signals via an ultrasonic, infrared, or radio link.

It is also known to use terminals such as smartphones or tablet computers, which include wireless connection means, to emulate remote controls so that these smartphones and tablets can be used in place of specialized remote control devices.

In these cases of emulation, a specific application is generally loaded into the smartphone or tablet, which application simulates the operator interface on a screen and encodes the transmitted signals according to the specifications of the replaced remote control.

When such smartphones or tablets are connected to an internet network, they have access to read data, like any connected computer, and in some cases also the capability to remotely operate connected household devices.

In these various applications, the operator of the smartphone or tablet acts on his own environment, particularly on his household devices, in order to meet needs that he has determined in advance.

When he changes devices or his needs evolve, he must then reconsider the applications he has installed.

OBJECT AND SUMMARY OF THE INVENTION

The present invention expands the scope of application of personal mobile terminals such as smartphones and tablets by integrating the personal terminal into the local environment of an aircraft cabin, the terminal thus becoming, in the context of the invention, an aircraft cabin device.

The aircraft cabin of the invention comprises a plurality of seats wherein at least one seat of said plurality of seats is paired with a passenger terminal.

Said seat and said paired passenger terminal communicate with each other wirelessly in order to transmit digital data related to capabilities for adjusting said seat from a control unit of the seat in question to the passenger terminal and to transmit digital data related to instructions for adjusting the seat from the passenger terminal to the control unit of the seat.

The passenger terminal includes application software that interprets the data received from the control unit of the seat so as to display on a screen of the passenger terminal a representation of the possible adjustments for the seat and interprets actions by an operator on keys of the passenger terminal as instructions for adjusting the seat.

The passenger terminal, such as a smart phone or tablet computer having a touch screen constituting a user-friendly interface, is thus integrated into a cabin control system that enables the passenger to interact via a personal device with the commands that enable him to customize the seat assigned to him throughout a flight.

In one embodiment, the aircraft cabin comprises at least one main computer of said cabin, said computer exchanging digital data with at least one passenger terminal paired with a seat and with at least one fixed crew terminal and/or mobile crew terminal in order to transmit to said passenger terminal requests that said passenger terminal is authorized to send, and to transmit requests chosen by an operator on said passenger terminal from said passenger terminal to said crew terminal, and to transfer requests chosen by an operator on said crew terminal from said crew terminal to said passenger terminal, application software executed by said passenger and crew terminals displaying the requests received and displaying each of the interfaces for enabling operators to make requests.

It is thus possible to create a direct, personalized communication between each passenger and the members of the crew via exchanges initiated by choices displayed on the screens of the passenger and crew terminals. The requests are thus stored and can be managed over time, and their structured presentation, with presentations in various languages, can facilitate relations between the crew and a passenger.

In one embodiment, the control unit of at least one seat of the plurality of seats is connected via a wired digital connection to a communication module for directly transmitting the digital data related to instructions for adjusting said seat, received from the passenger terminal via a wireless connection, to the control unit of the seat in question.

This limits the physical transmission chain of the passenger's instructions for adjusting his seat, enabling rapid responses to the instructions.

In one embodiment, the control unit of each seat of the plurality of seats is connected via a wired digital connection to a communication module for transmitting to the control unit of the seat in question the digital data related to instructions for adjusting said seat, received via a wireless connection from a cabin communication unit, said cabin communication unit relaying the instructions for adjusting said seat sent by the passenger terminal via a wireless connection and received by said cabin communication unit.

In one embodiment, at least one seat comprises a communication module connected only to the control unit of the seat in question.

In one embodiment, at least one communication module is connected to several control units, each belonging to one of the seats in a group of immediately adjacent seats in said cabin.

In one embodiment, at least one communication module is used as a relay for transmitting data between a cabin communication unit and at least one other communication module.

These various embodiments, which can be combined, make it possible to adapt the structure of a system for exchanging data between the main computer, the seats, and the passenger and crew terminals so as to limit the power output, particularly in radio links, and in the event of a failure of certain components, to handle data transmissions with a minimum of negative consequences.

In one embodiment, the data exchanged between a passenger terminal and the main computer is received and transmitted by the one cabin communication unit either directly or via a communication module of a seat or group of seats.

Advantageously, for proper identification of a passenger's location, each seat of the plurality of seats is identified in the cabin by a unique identifier.

For example, a passenger terminal comprises an optical camera, and the application software of the passenger terminal is configured to decode a graphic code affixed to the seat and characteristic of the unique identifier during the pairing of said seat with said passenger terminal.

The invention also relates to a method for managing interactions between at least one passenger terminal communicating digital data via a wireless connection and at least one seat of a plurality of seats in an aircraft cabin as described above.

According to the method, application software for managing interactions is pre-installed in said at least one passenger terminal.

The method comprises a first step for pairing said at least one passenger terminal with the at least one seat via an identification by the passenger terminal of the seat and comprises a second initialization step, in which initialization step:
  capabilities for adjusting the seat are transmitted to the passenger terminal, and information previously stored in said passenger terminal is transmitted to the control unit of the seat;
  the application software displays on a screen of the passenger terminal, via graphical or textual representations, the functions accessible to an operator using said passenger terminal for modifying the settings of the seat.

During the pairing step, personal data of a passenger identified as the owner of the passenger terminal in said passenger terminal, stored in a memory of said passenger terminal, are transmitted to a main computer of the cabin, said main computer:
  verifying that an identity of said passenger corresponds to a passenger who has actually checked into the flight being boarded, and if necessary verifying, by comparison with a passenger manifest transmitted by a passenger-check-in counter, that the passenger is trying to pair his passenger terminal with the seat that was actually assigned to him when he checked in;
  storing said personal data so as to construct a table of the passengers who have actually boarded, and if necessary displaying on a screen of a crew terminal a seat map with the names of each of the passengers.

In one implementation, a passenger terminal receives from the main computer data characterizing requests that may be made by a passenger to the crew, said data received by the passenger terminal determining capabilities displayed on the screen of said passenger terminal, via which display screen the passenger makes requests.

In one implementation, a passenger terminal receives from the main computer information and/or requests and/or instructions generated by at least one fixed crew terminal and/or mobile crew terminal.

In one implementation, a passenger's personal data, stored in the main computer during the pairing of the passenger terminal with the seat, is displayed on at least one fixed crew terminal and/or mobile crew terminal by an operator's interaction with a screen of said at least one fixed crew terminal or mobile crew terminal, and/or upon receipt of a request sent by the passenger terminal and received by the main computer.

In particular, a passenger terminal paired with a seat, through the action of an operator of said passenger terminal:
  sends instructions for modifying the authorized settings of the seat by moving movable elements of the seat, modifying the brightness of an individual light of the seat, or modifying a flow and/or temperature of an individual air vent of the seat;
  sends requests for selecting a time to be woken up by an actuation of movements of moving elements of the seat and/or by a modification of the brightness of an individual light;
  sends requests to the attention of the crew in order to ask for assistance, reserve a dish for a meal, ask for a beverage, ask for a magazine, or order an item from the on-board duty-free shop, said requests being made via a graphical or textual interface displayed on the screen of the passenger terminal, said interface displaying only the requests that are possible at the time they are made.

In one implementation, a request sent to the attention of the crew, when it is received by the main computer, is transmitted to at least one mobile crew terminal identified by the main computer as being the crew terminal closest to the seat paired with the passenger terminal that is the source of the request, said mobile crew terminal for example being located in the cabin by the strength of a received signal.

These various implementations of the invention, which can be combined insofar as they are technically compatible, enable the passengers and the crew members to simplify the exchanges in the cabin environment and facilitate the tasks of the crew for improved passenger service.

In one implementation, the actions performed by an operator, theoretically the passenger in possession of the terminal, on a passenger terminal paired with a seat are stored in a memory of a control unit of the seat, and/or in a memory of the main computer, and/or in a memory of the passenger terminal in order to be subsequently transmitted to a center for processing statistics on the use of interactions in the cabin.

It is thus possible, in the name of providing better service, to record the passenger's preferences for a future flight without his having to define his preferences by filling out a detailed questionnaire.

In one implementation of the method, the interactions performed on the seat and/or any malfunctions detected by monitoring systems are stored in a memory of the seat and/or a memory of the main computer in the form of a history in order to be analyzed by a seat maintenance tool.

BRIEF DESCRIPTION OF THE DRAWINGS

The description and drawings of a particular embodiment of the invention will make it possible to better understand the objects and advantages of the invention. It is clear that this description is given only as an example, and is nonlimiting.

In the drawings.

FIG. 5a, the individual adjustments of each part of a seat and FIG. 5b, the storing of specific adjustments;

in FIG. 10a, the display of a selection, and in FIG. 10b the returned display of the order sent to the crew;

FIG. 11a a menu of available functions, FIG. 11b the safety instructions in the form of a video sequence, FIG. 11c information on the aircraft type and FIG. 11d information on the progress of the flight;

DETAILED DESCRIPTION OF THE EMBODIMENTS

Figure 1:
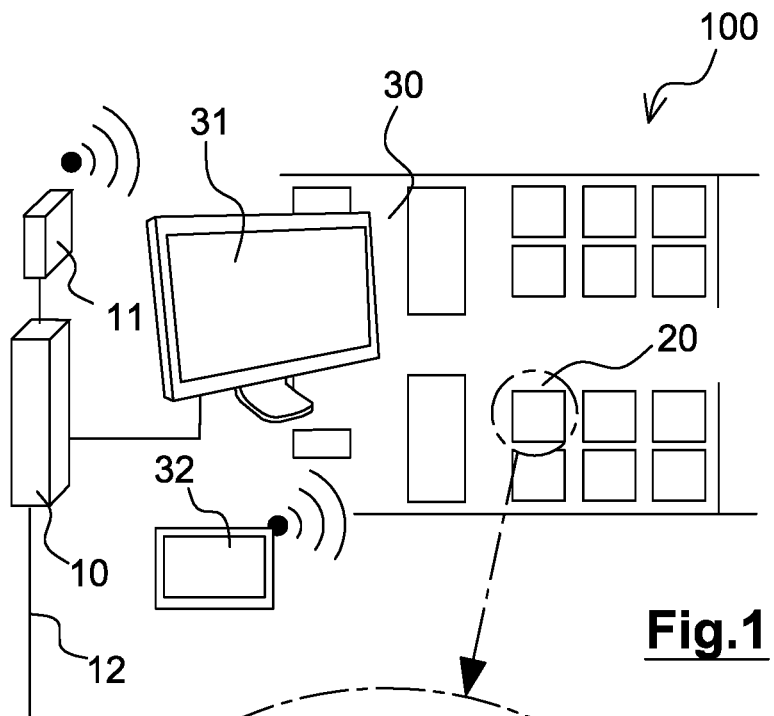
FIG. 1 schematically illustrates an aircraft cabin according to the invention and the main devices implemented.

FIG. 1 schematically illustrates an aircraft cabin 100 comprising a plurality of seats 20 and various devices capable of being integrated into the cabin of the invention.

In the rest of the description, the term terminal will be used to designate any type of terminal adapted to wireless data transmissions, carried or carryable by a passenger of the cabin, comprising capabilities for reconfigurable graphical and alphanumerical displays, for example a screen of adequate resolution, advantageously a color screen, and control buttons such as keys on a keyboard, rows or columns of menu keys located on the edges of a screen, or touch-sensitive areas of a screen in which symbols delimiting control buttons associated with these areas can be displayed.

Such a terminal is for example a mobile telephone/computer, often called a smartphone, or a tablet computer.

For the rest of the description, the mobile terminal considered as a nonlimiting example will be a telephone incorporating mobile computing functions, having a display screen covered with a tactile surface, and having the capability to receive and transmit digital data via a radio link in accordance with the Wi-Fi standard.

The case in which the terminal is provided with an integrated digital video camera will also be considered.

The cabin 100 comprises a plurality of passenger seats 20 and comprises at least one crew area 30 strictly dedicated to the activities of the cabin crew.

The seats 20 are conventional passenger seats in terms of their forms, dimensions, and capability for adapting to the passenger's desired comfort, particularly in terms of the mobility of various parts of the seat—seat back, seating surface, footrest, armrest—and in terms of auxiliary functions such as lights, ventilation, and individual entertainment devices, these various elements necessarily being considered to be incorporated into the term "seat" when it is used in the present description.

The seats 20 are also conventional in terms of their arrangement in the cabin 100, which can vary considerably depending on the dimensions of the cabin and the comfort offered by the operator of the aircraft.

As a nonlimiting example, FIG. 1 illustrates a cabin with four seats abreast and a center aisle.

Figure 1A:
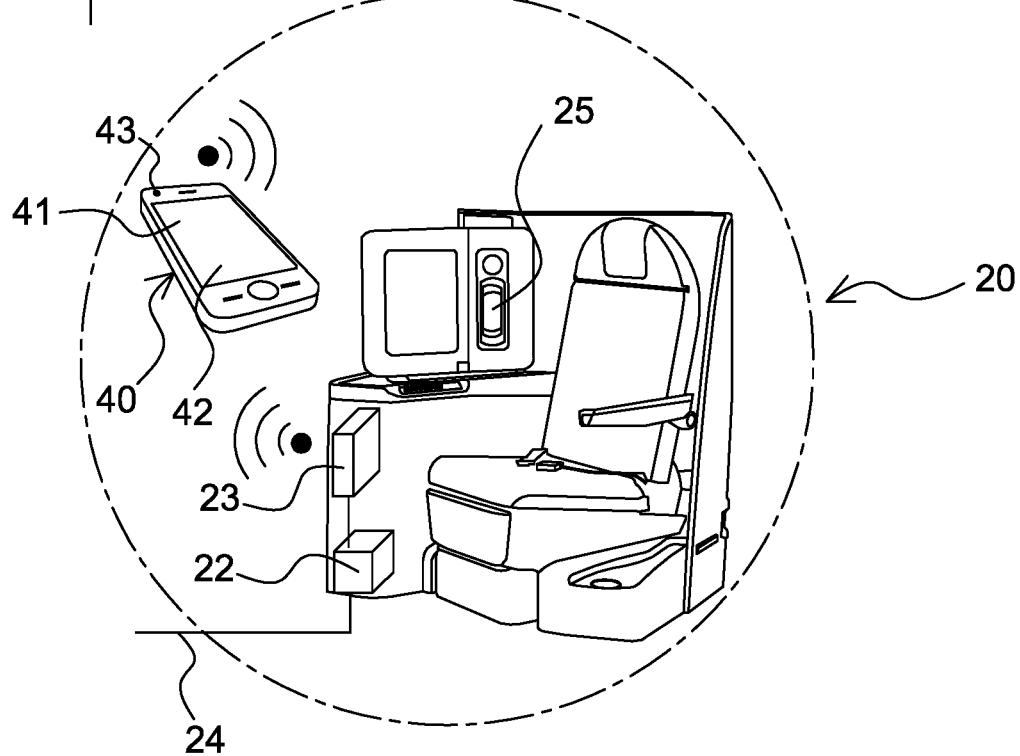
FIG. 1a illustrates an exemplary seat for a cabin of the invention.

In the cabin, as illustrated in the detail of FIG. 1a showing an isolated seat, each seat 20 is associated with a passenger terminal 40, at least when the seat is assigned to a passenger during a flight.

The passenger terminal 40 in the example illustrated comprises a display screen 41, advantageously a color screen, covered with a tactile surface 42 for interacting with the passenger terminal, and a video camera 43.

The seat 20 also comprises a control unit 22 which controls the different parts of the seat, particularly actuators and lights, and comprises a module 23 for transmitting and receiving communication signals.

In one embodiment, the module 23 can be shared between two or more seats.

If necessary, the seat also comprises a wired connection 24 for transmitting data between the control unit 22 of the seat and a main computer 10 of the cabin.

The crew area 30 comprises at least one fixed crew terminal 31 and/or at least one mobile crew terminal 32.

The main computer 10 controls the cabin and the data exchanges between the various devices of said cabin and the various terminals.

The main computer 10 is connected to at least one wireless cabin communication unit 11, and according to the communication network architecture used in the cabin of the invention, is connected to a wired digital data communication network 12.

In the cabin 100, the seats 20, the passenger terminals 40, the fixed crew terminal or terminals 31, and the mobile crew terminal or terminals 32 are functionally linked by digital data exchanges, which are necessarily wireless, at least during a step for transmission from or to the passenger terminals and mobile crew terminals, and which in the other cases are wired or wireless.

The various elements implemented in the present cabin 100 of the invention will be described in detail and more clearly understood in the detailed description of exemplary embodiments of the invention.

In an aircraft assigned to passenger transport, each passenger, at the time of his reservation or his check-in prior to boarding, is generally assigned a seat identified in the cabin by its location, seat number, or position in a row determined by a number, for example.

In the present case, it is assumed that the passenger has a passenger terminal 40, i.e. that either the passenger owns a smartphone, a tablet, or any other personal device suitable for use as a passenger terminal, or a passenger terminal was provided to him when he checked in or boarded the aircraft.

Prior to its initial use, application software is loaded into the passenger terminal 40, which application software, once launched in order to be run on said passenger terminal, manages the data transfers between said passenger terminal and the other devices of the cabin 100 with which interactions are provided, determines the displays rendered on the display screen 41 of said passenger terminal, and interprets the actions performed on the controls of said passenger terminal.

The application can be loaded using any conventional method, for example via a link with a remote download server or with a local computer.

In a first step, once the application software is up and running, the passenger terminal 40 is paired with the seat assigned to the passenger. The pairing is performed by communicating a unique identifier 21 of the seat to the passenger terminal.

The unique identifier, for example equivalent to an alphanumeric character string, can be entered by means of a keyboard of the mobile terminal.

Advantageously, the application software comprises a subprogram for recognizing images provided by the video camera 43 of the passenger terminal, which is active when the passenger terminal is in the pairing phase so as enable the reading of a bar code or a two-dimensional code, often called a QR Code, which code is displayed on the seat, and if necessary, printed on the boarding pass that is given to the passenger during his boarding.

Figure 2A:
FIGS. 2a and 2b illustrate exemplary displays on the screen of the passenger terminal during a step for pairing the mobile terminal with a seat.
Figure 2B:
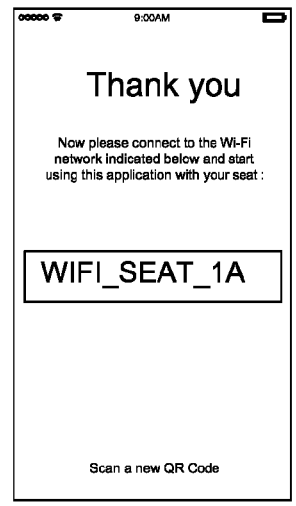
Figure 3:
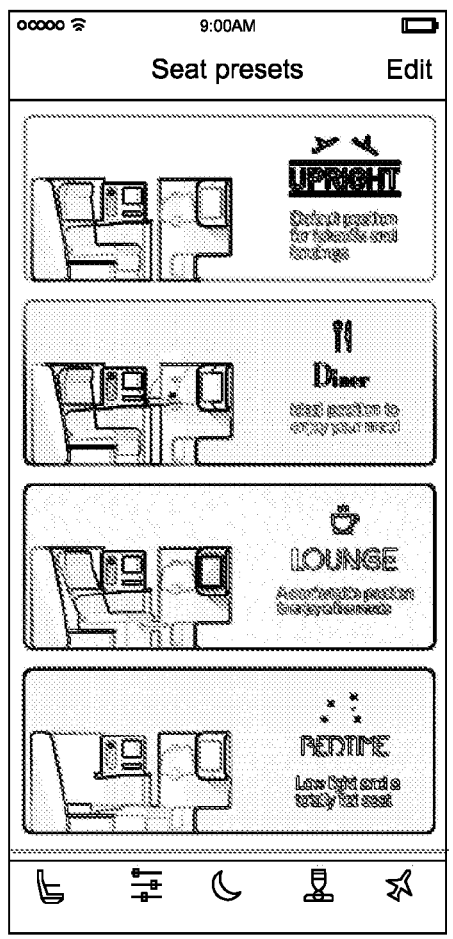
FIG. 3 illustrates an exemplary display for requesting seat adjustments from the passenger terminal.

In this case, the pairing is carried out by simply reading, by means of the camera 43 of the passenger terminal, the code on the seat or on the boarding pass, as in the example of the capture of a QR code illustrated in FIG. 2a and the confirmation of the capture in FIG. 2b.

Advantageously, during the pairing operation, an identifier of the passenger terminal 40 is transmitted to the cabin system so that said passenger terminal cannot be paired with a second seat and so that no other passenger terminal can be paired with the same seat until the cabin system is reinitialized.

When the passenger terminal 40 is paired with the seat 20, said terminal becomes a device of the cabin 100 and is functionally known to the main computer 10 and, directly or indirectly, to other elements of the cabin with which it interacts within functional limits provided by the application software and controlled by the main computer 10.

It is understood that the interactions of a passenger terminal 40 with a seat 20 can only take place, at least initially, with the seat with which said passenger terminal has been paired.

The pairing of the passenger terminal with a seat 20 results in a set of data exchanges, the effect of which will be to modify the behaviors of the various elements of the cabin.

Figure 4:
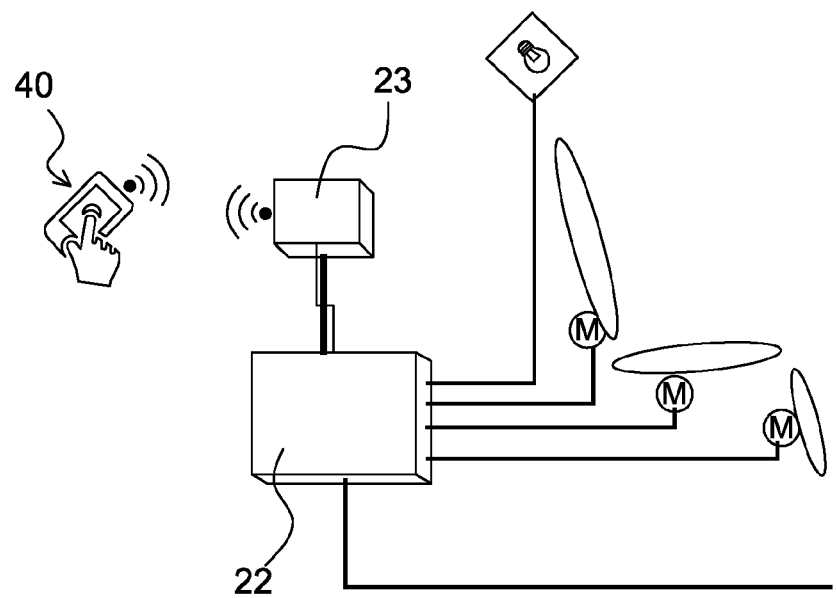
FIG. 4 schematically illustrates the elements constituting a system for controlling the movements of the seat.

In particular:
- the capabilities for adjusting the seat 20 and its various subassemblies, an example of which is schematically illustrated in FIG. 4, are transmitted to the passenger terminal 40, and information stored by the passenger in his passenger terminal prior to the start of the flight, or in a history of previous flights, are transmitted to the control unit 22 of the seat;
- personal data on the passenger, particularly his first and last name, are transmitted to the main computer 10 in order to construct a table of the passengers actually on board. During this phase, the main computer 10 verifies, if necessary, that the passenger is trying to pair his passenger terminal with the seat that was actually assigned to him when he checked in, a return message being capable of notifying him in the event of a placement error;
- the display on a screen of a crew terminal 31, 32 of the seat map of the cabin with the names of each of the passengers in the seats they occupy in the cabin, and the capability for a crew member to consult each passenger's personal data. In this pairing stage, it is also possible to verify that the passenger is seated in accordance with the seat map provided at check-in, which is also transmitted, for example via a "gatelink" connection, and if necessary to approve any modifications.

The pairing also has the effect of opening communication capabilities between the passenger terminal 40 and the crew terminals 31, 32.

It is thus possible, by means of controls offered in menus displayed by the application program on a screen of the passenger terminal, for the passenger to send requests to the attention of the crew.

Advantageously, during the pairing, the main computer 10 of the cabin transmits to the passenger terminal 40 configuration information that is used by the application program to adjust the capabilities of said passenger terminal, for example by inhibiting the display of functions that are not accessible in the cabin in question.

In particular, the menu makes it possible to define various requests that go well beyond what is offered by the simple flight attendant call button in conventional cabins.

For example, it is possible for the passenger to directly request a beverage, selected from a list of offered beverages, to request an offered service, or to call for emergency assistance.

Figure 7:
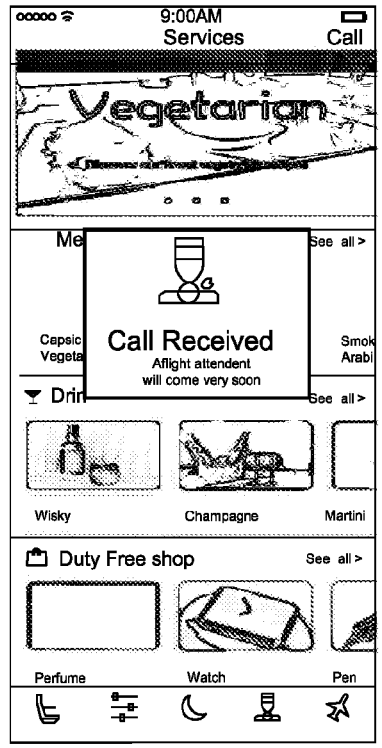
FIG. 7: an exemplary display of a response to a call to a flight attendant on the screen of the passenger terminal.

FIG. 7 illustrates a display on a passenger terminal screen of a sent notice in response to an action by the passenger for sending a call to a crew member, letting the passenger know that his call has actually been sent.

Figure 8:
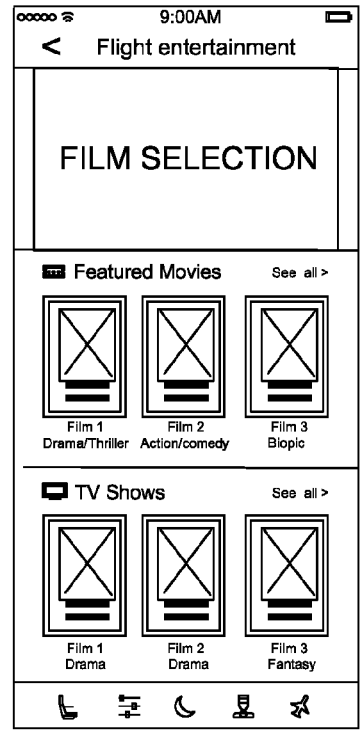
FIG. 8: an exemplary selection page, in this example a selection of a film to be displayed on the screen of the passenger terminal.

FIG. 8 shows an exemplary selection of films offered to the passenger on his mobile terminal, where pressing on the representation of a film or other selection results in the film's being shown on the seat's video screen, possibly after a submenu in which the passenger has selected options such as the language.

Figure 9:
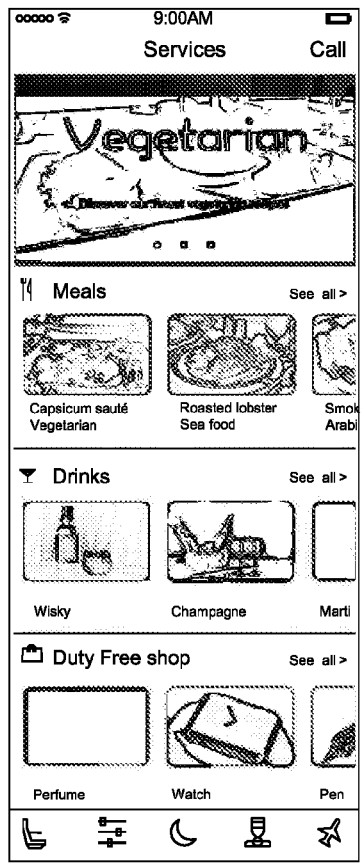
FIG. 9: an exemplary selection page, in this example a selection of dishes and beverages for the meal, displayed on the screen of the passenger terminal.

FIG. 9 shows a display on the screen of the passenger terminal whereby a passenger can choose the dishes and beverages of a meal.

Figure 10A:
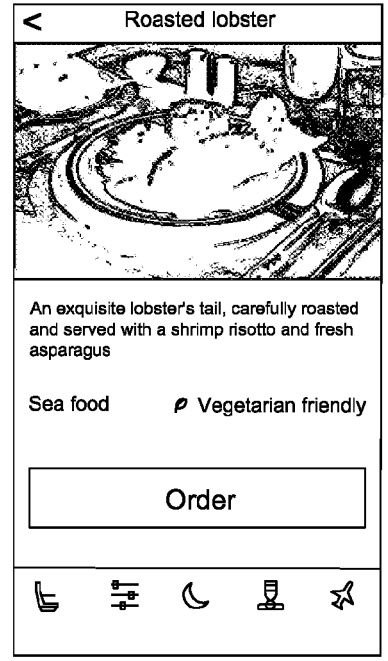
FIGS. 10a and 10b illustrate an exemplary sequence of displays on the screen of the mobile terminal in the selection of a dish from the menu.
Figure 10B:

FIG. 10a shows the presentation on the screen of the passenger terminal of a selected dish and FIG. 10b shows the return of the order placed.

Figure 11A:
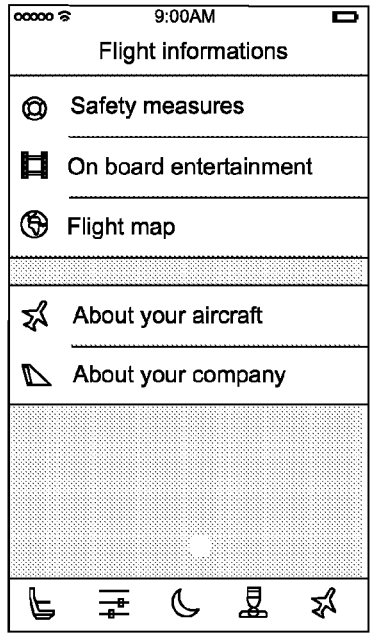
FIGS. 11a, 11b, 11c, 11d: exemplary displays on the screen of the passenger terminal of general information on the current flight.
Figure 11B:
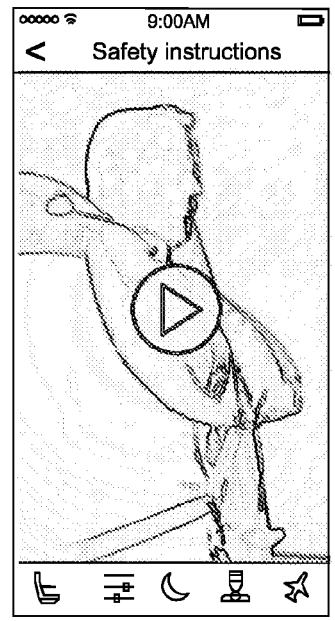
Figure 11C:
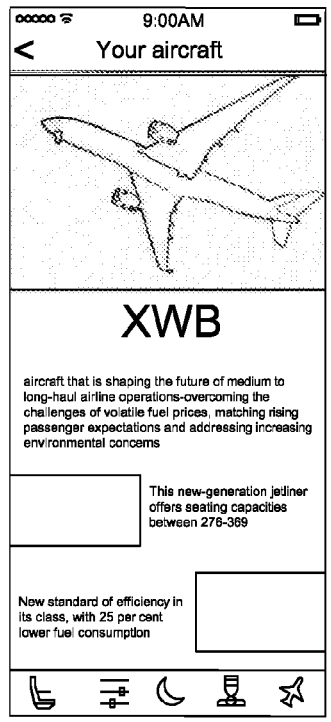
Figure 11D:
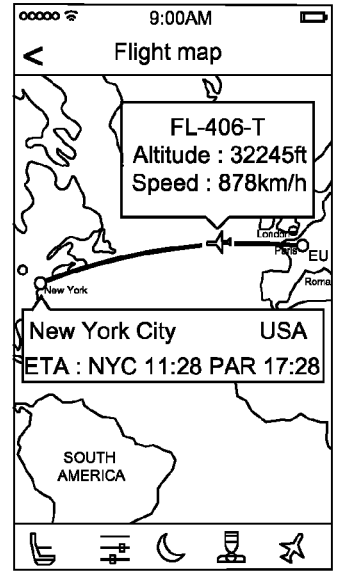

FIGS. 11a through 11d illustrate examples of information that can be consulted by the passenger on his mobile terminal via a selection page, FIG. 11a; the passenger can consult, for example, the safety instructions, FIG. 11b, information on the type of aircraft he is flying on, FIG. 11c; or even information on the flight and its progress, FIG. 11d.

When the passenger sends a request, it is submitted to the crew by a display on a screen of a crew terminal 31 or 32.

Based on the information transmitted by the passenger terminal on which the request has been made, the main computer identifies the passenger and the corresponding seat, which are advantageously displayed in the form of a graphical representation, along with the content of the request on the screen of at least one crew terminal.

It is thus possible for the crew to fulfill the request faster, while avoiding unnecessary movements through the cabin.

In one embodiment, the crew members preferably each have a mobile crew terminal 32, which enables a crew member to receive a request sent from a passenger terminal, even when the crew member in question is moving about the cabin.

In this case, advantageously, only the mobile crew terminal 32, in addition to a fixed terminal 31, closest to the seat corresponding to the passenger terminal that sent the request, displays the request. Examples of methods for defining a position of a mobile crew terminal 32 in the cabin will be given in the description of an architecture of the invention.

It is thus possible for the flight attendant closest to the passenger in question to take action to fulfill the request, ask for details on the request, or send a message letting the passenger know the request will be fulfilled as soon as possible.

In one embodiment, the request from the passenger remains displayed on the crew terminal or terminals, associated with an acknowledgement button that will only be pressed when the request has been handled. Consequently, particularly in the case of requests sent in quick succession or simultaneously from different passenger terminals, requests are managed so as to prevent some of them from being forgotten, which might otherwise lead the passenger to resend the request.

In the case where several requests are displayed simultaneously on several fixed or mobile crew terminals, an acknowledgement of a request will cause the request to disappear, not only from the crew terminal in which the acknowledgment is entered, but also in every terminal on which the request was displayed.

The passenger terminal 40 also enables the passenger to interact directly with the cabin for the part that affects him, i.e., primarily the seat he occupies and his immediate environment.

The passenger, via his mobile terminal 40 has the capability to adjust his seat.

The capabilities for adjusting the seat are understood to include not only the movement of the moving parts of the seat, which enables the passenger to set positions based on his wake-sleep phases and the activities he engages in, but also auxiliary functions such as adjusting the brightness of the light at his seat, and adjusting the air vents or the controls related to the use of devices for the passenger's entertainment.

It should be noted that depending on the seat model used in the cabin or assigned to the passenger, the adjustment capabilities may be different, and that in that case, the displays of the adjustment functions offered to the passenger on his passenger terminal 40 are adapted based on the data transmitted to the passenger terminal during the pairing, so that only the available or usable functions are offered.

Figure 5A:
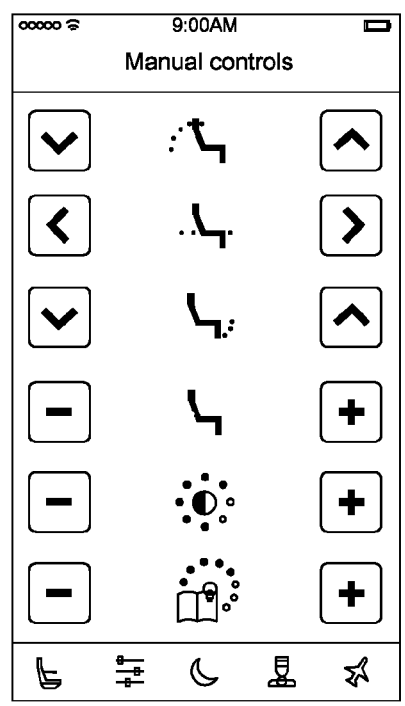
FIGS. 5a and 5b illustrate exemplary displays on the screen of the mobile terminal of the functions made available to the passenger via his mobile terminal.
Figure 5B:
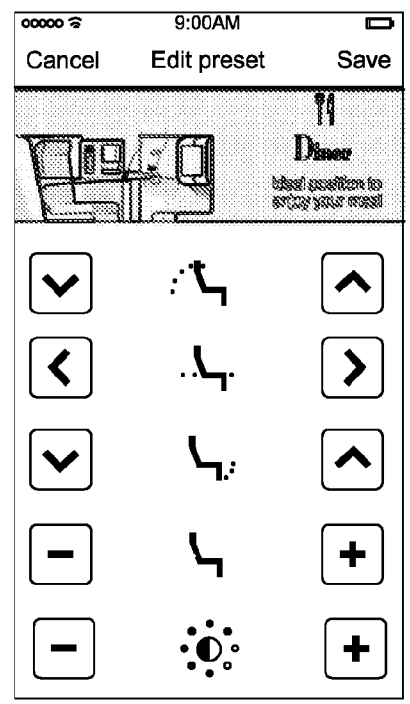

FIGS. 5a and 5b illustrate how the passenger terminal 40 is configured during the pairing so as to adapt the functions accessible to the passenger via displays on the screen of the passenger terminal of the possible adjustments of the various parts of the seat and how the passenger can store preferred settings or use pre-stored settings.

In a particular embodiment, a seat maintenance assistance device is capable of detecting adjustments that are unusable, for example due to a malfunction, which limitation is advantageously reflected in the capabilities offered to the passenger on his passenger terminal.

Advantageously, the passenger has in his passenger terminal 40 controls for storing adjustments of the seat that correspond to preferred positions. In addition to the fully reclined position and the position required for the takeoff and landing phases of the aircraft, customized positions for relaxing, reading, waking up, etc. can be stored by the passenger in his passenger terminal 40.

The personal positions stored in the passenger terminal during a flight or during previous flights, as long as the stored positions correspond to the model of the assigned seat in the cabin 100, are advantageously transmitted to the seat 20 during the pairing of the passenger terminal with the cabin, so that these preset positions can also be selected from a dedicated fixed control panel 25 of the seat.

The passenger also has the capability to program specific functions of the seat in based on his personal preferences.

For example, when a seat has a "massage" mode, the passenger terminal makes it possible to activate the "massage" function and to set a duration for the massage so that it ends automatically.

For example, a passenger terminal makes it possible to set a desired wake-up time with which specific actions of the seat, chosen by the passenger, can be associated, such as vibrations of certain moving elements of the seat or variations in the brightness of the lights dedicated to the seat.

Figure 6A:
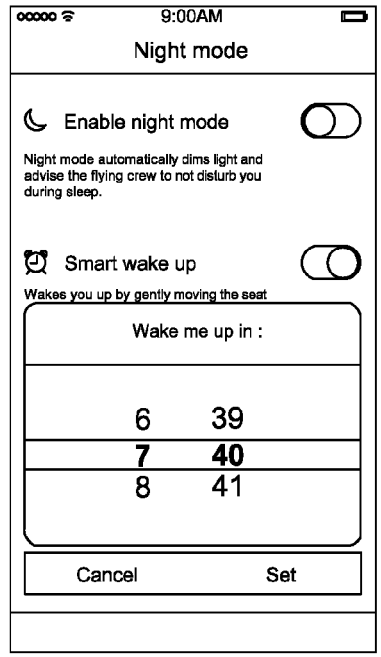
FIGS. 6a and 6b: exemplary displays on the screen of the mobile terminal for entering a wake-up time, FIG. 6a, and for controlling and activating an entered wake-up time.
Figure 6B:
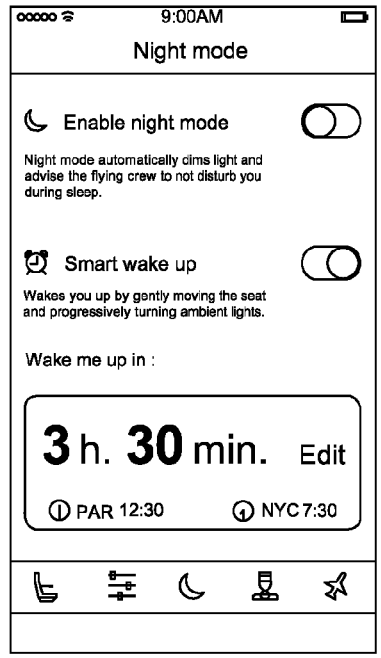

FIG. 6a illustrates the display on a passenger terminal screen during the selection of a wake-up time, and FIG. 6b shows the same screen upon activation of the time selected.

The passenger terminal also enables the crew to transmit information or messages to the passenger of a seat.

Certain messages, for example "fasten your seatbelts," are meant to be addressed to all the passengers, like the safety messages that are generally broadcast on all the passenger terminals without distinguishing between seat locations.

However, if the information on the passenger during the pairing includes a passenger's nationality, the messages may be displayed on the passenger terminal in the corresponding language, theoretically in addition to other standardized languages.

Other messages can be customized based on the passenger terminal.

For example, a passenger who has forgotten to place his seat in the takeoff/landing position during either of those phases will receive a message specifically intended for him, asking him to please adjust his seat position.

This request is possible insofar as the main computer 10 knows the current adjustments of each of the seats and transmits to the crew the identity of the seat that is not properly adjusted.

Among the activities of a cabin crew, the meals served to the passengers are a source of intense activity, particularly in the higher-class cabins where it is customary to offer the passengers choices, which can sometimes be difficult to manage when passengers' wishes should be satisfied as much as possible.

In one embodiment, the crew submits to each passenger, via a display on his passenger terminal 40, a menu of available dishes in which he can first select a meal and then validate his selection, which is then transmitted to the main computer and can be consulted by the crew members by means of the crew terminals at their disposal.

It is then possible for the crew to bring the selected meals directly to each of the passengers, possibly within a time frame defined by each passenger during the selection of his meal.

In one embodiment, a personalized menu of the selected meal is printed, for example indicating the first and last name, an image of the passenger's national flag, or any other form of courtesy.

In one embodiment, personal information concerning the passenger's preferences and/or dietary restrictions, transferred to the main computer 10 during the pairing of the passenger terminal 40, are used by the main computer to detect any problems with the menu selected and to indicate these problems to the crew in charge of personally handling the relation with the passenger.

In one embodiment, the wishes of a regular passenger of the company operating the aircraft are stored in the passenger terminal. The stored history is transmitted, with the passenger's consent, to the main computer 10, or if applicable to a customer needs management system of the operating company, making it possible from the moment a passenger reserves a flight to verify whether his preferred services will be available, and if necessary, to take specific measures whenever possible.

Thus, preferences as diverse as, for example, favorite wines, favorite films, or having a second pillow available can be known and anticipated during the preparation of the aircraft or by the crew during the flight.

In one embodiment, the various passenger actions and requests fulfilled during a flight are stored by the passenger's passenger terminal 40, and before the end of the flight, for example while taxiing to the gate, the main computer asks the passenger, via a message sent to said passenger terminal, whether he consents to the saving of the data related to his use of services on board the aircraft.

This data will advantageously be used to better prepare for a passenger's subsequent flight with the same company, to anticipate preventive maintenance operations based on the actual use of the seat mechanisms, and to improve the design of future devices by objectively identifying, in real conditions, the functions most often used and appreciated by passengers.

In one embodiment, data related to technical problems revealed during the use of a seat are stored by the control unit of the seat 22 and/or by the main computer 10 to which the information on the detected technical problem is transmitted by the control unit of the seat.

In the context of seat maintenance, the data are processed after the flight by an application dedicated to the processing of said data.

In one embodiment, a maintenance operator has a mobile terminal that enables him to consult, via wireless links, the maintenance data recorded during the use of the seat and to act as efficiently as possible in terms of reactivity and the relevance of his operation.

As explained above, a passenger terminal 40, once paired, is a device of the cabin 100 in which it performs the functions whose principles have been explained in practical examples.

In an aircraft cabin 100, each seat is potentially occupied by a passenger in possession of his own terminal 40, i.e. a personal smartphone or personal tablet comprising the application software.

Although each passenger terminal is paired with a seat assigned to the passenger in possession of said passenger terminal, the multiplicity of passenger terminals capable of sending and receiving at the same time in the confined environment of the cabin, requires organizing a communication network for the digital data coming from various transmitters: the passenger terminals 40, the seats 20, the main computer 10, and the crew terminals 31, 32, which are also receivers.

The mobile passenger 40 or crew 32 terminals are necessarily connected to the communication network by wireless links.

Fixed devices such as the seats and the fixed crew terminals can be connected to the main computer 10 by wired connections or wireless connections.

In all of the possible cases for the organization of the digital data communication network, there must clearly always be an access path between the devices that have to exchange data.

However, this condition alone is not necessarily sufficient, due to the fact that the transmission times must not introduce latency between a command and the action that must result from this command.

For example, in the case of a command for modifying a position of an element of the seat, the passenger should notice a result of his action within a relatively brief time, on the order of a tenth of a second.

In the case of a request sent to the crew, the transmission of the data can exceed one second without any practical consequences, as long as the visual response on the screen of the passenger terminal is fast enough to avoid any tendency to repeat an action.

The result of these constraints is that certain communications must be transmitted via short paths to limit any latency in the accepted time frames.

In the exemplary embodiment, wireless communications are implemented via radio links in accordance with the Wi-Fi communication standard, which is available on many devices that can be used as passenger terminals and that many people today already own.

Figure 12:
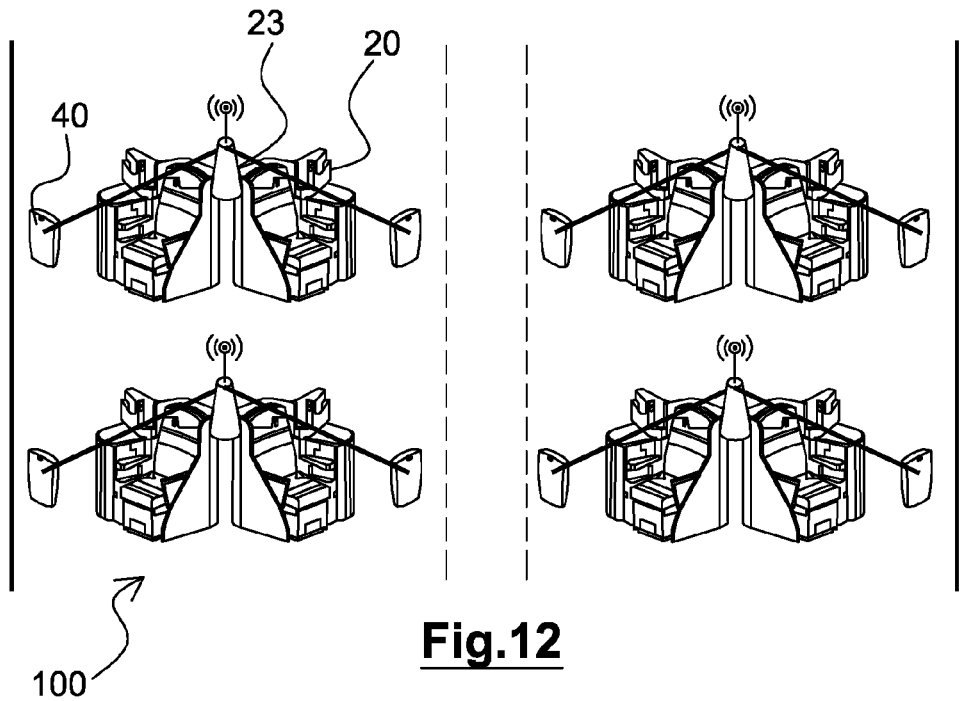
FIG. 12: a first exemplary architecture of the data communication system in the cabin.

FIG. 12 illustrates an exemplary network wherein the passenger terminals 40 communicate directly with a communication module 23 associated with the seat with which the terminal is paired. In one embodiment, as in the example illustrated, a module is shared between two adjacent seats, making it possible to limit the number of communication modules installed in the cabin. This arrangement has the advantage of near-direct communication between the passenger terminal and the seat, which has the effect of limiting both the transmission time and the required radio transmission power given the proximity of the passenger terminal and the seat with which it is paired during the flight of the aircraft.

In this embodiment, the communications between the seat 20 and the main computer 10 can be implemented either wirelessly by the communication module 23 or by the wired connection means.

In this embodiment, the communications of the passenger terminal 40 with the main computer 10 can be implemented directly via radio link between said passenger terminal and said computer, or in another embodiment with the communication module 23 of the seat used as a relay, which in that case plays the role of a router.

Figure 13:
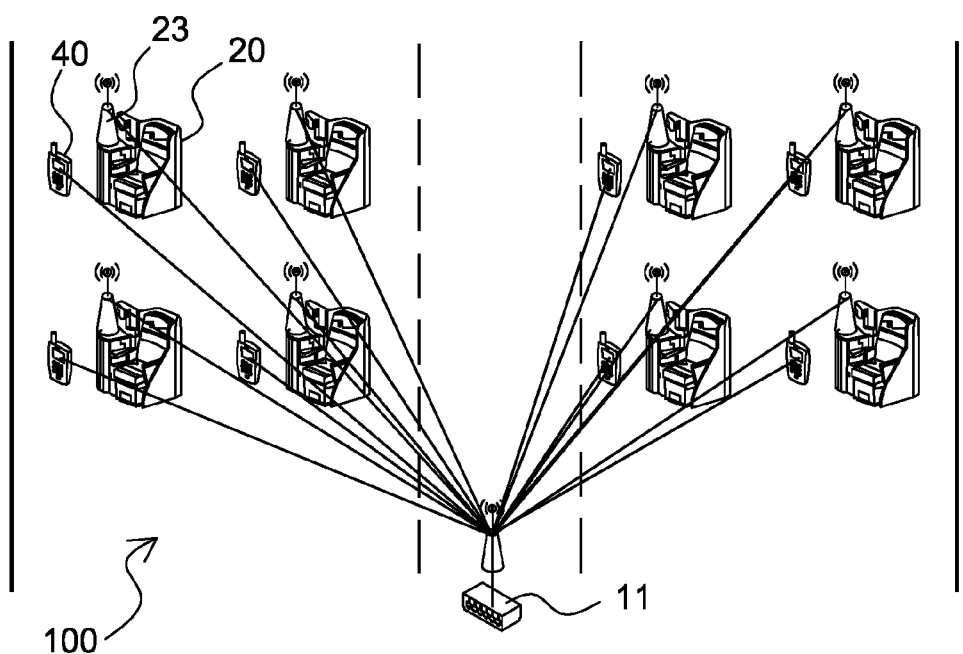
FIG. 13: a second exemplary architecture of the data communication system in the cabin.

FIG. 13 illustrates another exemplary network wherein all the communications of the devices of the cabin, particularly the passenger terminals 40, the mobile crew terminals and the seats, take place between the devices in question, considered to be clients, and the wireless cabin communication unit 11 or a small number of wireless communication units, said communication unit advantageously fulfilling the function of a data router through which all communications pass.

Figure 14:
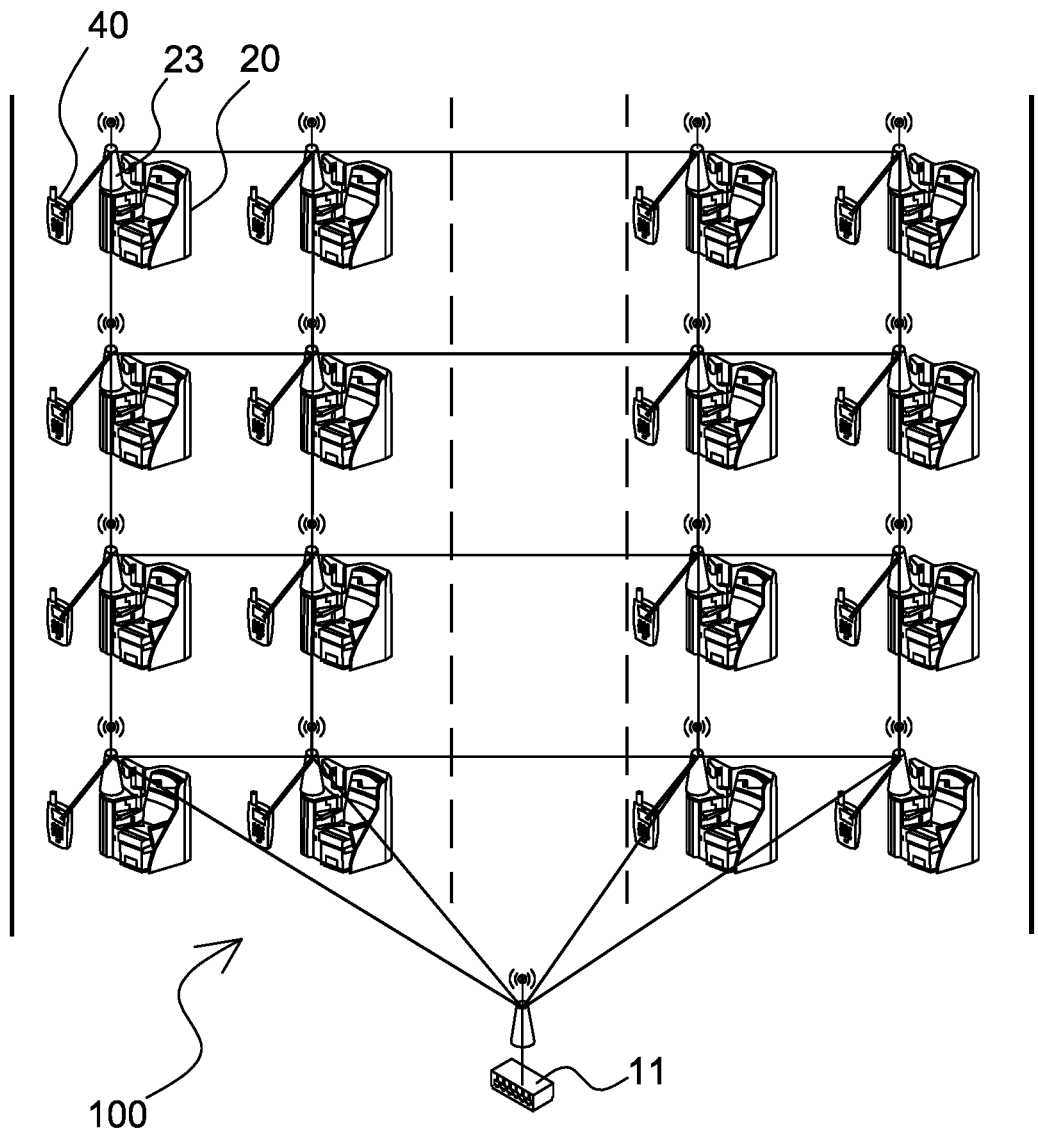
FIG. 14: a third exemplary architecture of the data communication system in the cabin.

FIG. 14 illustrates another exemplary network constituting a mesh grid wherein each passenger terminal 40 is in communication with the seat 20 with which it is paired via a communication module 23 of the seat or of a group of seats, similar to the arrangement of the embodiment of FIG. 12 but wherein the communications with the main computer 10 pass through the communications modules of various seats, which in this case are used as repeaters for transmitting the data to a wireless cabin communication unit 11.

This limits the power required for the transmission of the data and provides redundant paths through which the data can be transmitted in order to compensate for potential failures of certain devices used to transmit the data.

The invention claimed is:

1. An aircraft cabin comprising a plurality of seats with at least one seat of said plurality of seats is paired with a passenger terminal, said seat and said paired passenger terminal communicates with each other wirelessly to transmit digital data related to capabilities for adjusting said seat from a control unit of said seat to said paired passenger terminal, and to transmit digital data related to instructions for adjusting said seat from said paired passenger terminal to the control unit of said seat, said paired passenger terminal comprises an application software that interprets the digital data received from the control unit of said seat to display a representation of possible adjustments for said seat on a screen of said paired passenger terminal and interprets actions by an operator on keys of said paired passenger terminal as instructions for adjusting the seat.

2. The aircraft cabin according to claim 1, further comprising at least one main computer of the aircraft cabin, said computer exchanging the digital data with said paired passenger terminal and with at least one of a fixed crew terminal and a mobile crew terminal, said main computer transmits to said paired passenger terminal an authorization that said paired passenger terminal is authorized to send, transmits requests chosen by an operator on said paired passenger terminal to said crew terminal from said paired passenger terminal, and transfers requests chosen by an operator on said crew terminal to said paired passenger terminal from said crew terminal; and the application software executed by said paired passenger terminal and said crew terminal display, on its respective screen, the requests received and each interface to enable operators of said passenger and crew terminals to generate the requests.

3. The aircraft cabin according to claim 2, wherein the digital data exchanged between said paired passenger terminal and said main computer is received and transmitted by a cabin communication unit either directly or via a communication module of a seat or group of seats; wherein the control unit of said seat is connected via a wired digital connection to the communication module, the communication module is configured to transmit to the control unit the digital data related to the instructions for adjusting said seat received from the cabin communication unit via a wireless connection, the cabin communication unit is configured to relay the instructions for adjusting said seat sent by said paired passenger terminal via the wireless connection and received by the said cabin communication unit.

4. The aircraft cabin according to claim 1, wherein each seat of said plurality of seats is identified in the aircraft cabin by a unique identifier.

5. The aircraft cabin according to claim 4, wherein said paired passenger terminal comprises an optical camera, and wherein the application software of said paired passenger terminal is configured to decode a graphic code affixed to said seat and characteristic of an unique identifier during a pairing of said seat with said paired passenger terminal.

6. The aircraft cabin according to claim 1, wherein the control unit is connected via a wired digital connection to a communication module, the communication module is configured to directly transmit the digital data related to the instructions for adjusting said seat received from said paired passenger terminal to the control unit of said seat via a wireless connection.

7. The aircraft cabin according to claim 6, wherein at least one seat comprises the communication module connected only to the control unit of said at least one seat.

8. The aircraft cabin according to claim 6, wherein the communication module is connected to several control units, each control unit being associated with one of said plurality of seats in a group of immediately adjacent seats in the aircraft cabin.

9. The aircraft cabin according to claim 1, wherein the control unit of said seat is connected via a wired digital connection to a communication module, the communication module is configured to transmit to the control unit the digital data related to the instructions for adjusting said seat received from a cabin communication unit via a wireless connection, the cabin communication unit is configured to relay the instructions for adjusting said seat sent by said paired passenger terminal via the wireless connection and received by the said cabin communication unit.

10. The aircraft cabin according to claim 9, wherein the communication module is utilized as a relay to transmit data between the cabin communication unit and at least one other communication module.

11. Method for managing interactions between at least one passenger terminal communicating a digital data via a wireless connection and at least one seat of a plurality of seats in an aircraft cabin, an application software for managing the interactions is pre-installed in said passenger terminal, comprising:
    a first step of pairing said passenger terminal with said seat via an identification by said passenger terminal; and
    a second step of initialization, in which:
        capabilities for adjusting said seat are transmitted to said passenger terminal, and information previously stored in said passenger terminal is transmitted to a control unit of said seat; and
        the application software displays on a screen of said passenger terminal, via graphical or textual representations, functions accessible to an operator of said passenger terminal to modify settings of said seat.

12. The method for managing interactions according to claim 11, further comprising the step of storing actions performed by an operator on said passenger terminal paired with said seat in at least one of a memory of said control unit of said seat, a memory of a main computer, and a memory of said passenger terminal to be subsequently transmitted to a center for processing statistics on the use of interactions in the aircraft cabin.

13. The method for managing interactions according to claim 11, further comprising the step of storing at least one of the interactions performed on said seat and malfunctions detected by monitoring systems in at least one of a memory of said seat and a memory of the main computer in the form of a history to be analyzed by a seat maintenance tool.

14. The method for managing interactions according to claim 11, wherein during the pairing step, a personal data of a passenger identified as an owner of said passenger terminal stored in a memory of said passenger terminal are transmitted to a main computer of the aircraft cabin, said main computer:
    verifies that an identity of said passenger corresponds to a check-in passenger who has actually checked into a flight being boarded and that said passenger terminal is being paired with a seat assigned to said passenger; and
    stores said personal data to construct a table of passengers who have actually boarded; and
    optionally displaying a seat map with names of each of the passengers on a screen of a crew terminal.

15. The method for managing interactions according to claim 14, further comprising the step of verifying the identity of said passenger by comparing said personal data to a passenger manifest received from a passenger-check-in counter by the main computer.

16. The method for managing interactions according to claim 14, further comprising the step of receiving data characterizing requests that can be made by said passenger to a crew from the main computer by said passenger terminal, said data received by said passenger terminal determines capabilities displayed on the screen of said passenger terminal and said requests are entered on the screen of said passenger terminal.

17. The method for managing interactions according to claim 14, further comprising the step of receiving, from the main computer by said passenger terminal, at least one of information, requests and instructions generated by at least one of a fixed crew terminal and a mobile crew terminal.

18. The method for managing interactions according to claim 14, further comprising the step of displaying said personal data of said passenger stored in the main computer during the pairing of said passenger terminal with said seat on said at least one of the fixed crew terminal and the mobile crew terminal by at least one of the following: an operator's interaction with a screen of said at least one of the fixed crew terminal and the mobile crew terminal, and upon a receipt of a request from said passenger terminal by the main computer.

19. The method for managing interactions according to claim 14, wherein said passenger terminal is paired with said seat through an action of an operator of said passenger terminal:
- sends instructions to modify authorized settings of said seat by moving movable elements of said seat, modifies brightness of an individual light of said seat, or modifies at least one of a flow and a temperature of an individual air vent of said seat;
- sends requests to select a time to be woken up by at least one of an actuation of movements of moving elements of said seat and a modification of the brightness of the individual light; or
- sends requests to the attention of a crew to ask for assistance, to reserve a dish for a meal, to ask for a beverage, to ask for a magazine, or to order an item from an on-board duty-free shop, said requests being made via a graphical or textual interface displayed on the screen of said passenger terminal, said graphical or textual interface displaying only said requests that are possible at a time they are made.

20. The method for managing interactions according to claim 19, further comprising the step of transmitting a request sent to the attention of the crew and received by the main computer to at least one mobile crew terminal identified by the main computer as being closest to said seat paired with said passenger terminal that is a source of the request, said mobile crew terminal is located in the aircraft cabin by a strength of a received signal.

* * * * *